Figure 1:
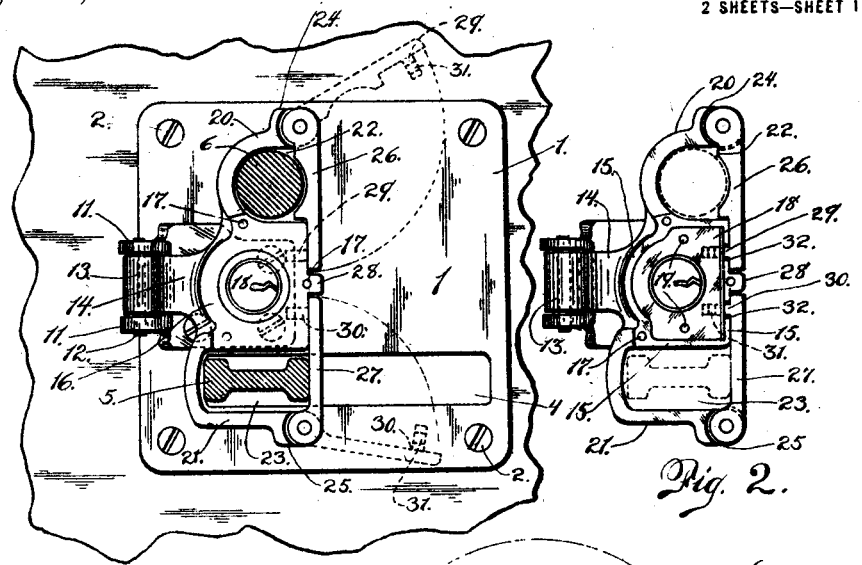

J. BRUEHNE.
LOCKING DEVICE.
APPLICATION FILED JAN. 12, 1916.

1,179,275.

Patented Apr. 11, 1916.
2 SHEETS—SHEET 1.

Witness
John B. Oade

Inventor
John Bruehne.
By Wilkinson, Ginsta & Mackaye
his Attorneys

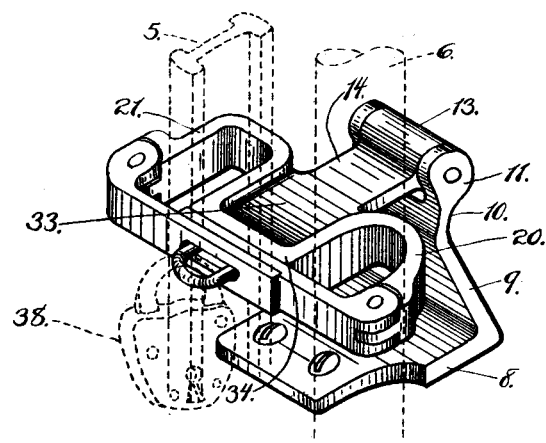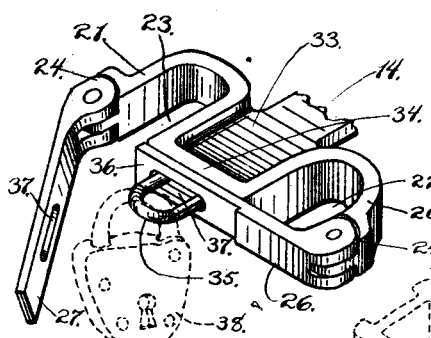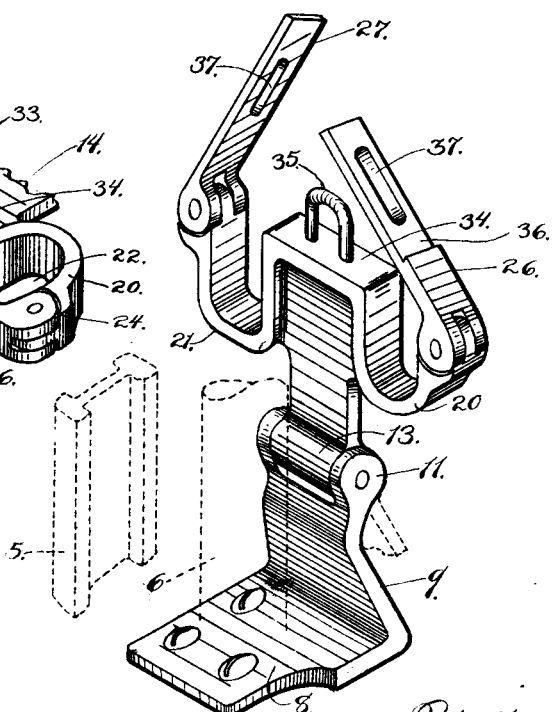

UNITED STATES PATENT OFFICE.

JOHN BRUEHNE, OF DENVER, COLORADO.

LOCKING DEVICE.

1,179,275.  Specification of Letters Patent.  Patented Apr. 11, 1916.

Application filed January 12, 1916. Serial No. 71,767.

*To all whom it may concern:*

Be it known that I, JOHN BRUEHNE, a citizen of the United States, residing in the city and county of Denver and State of Colorado, have invented certain new and useful Improvements in Locking Devices; and I do hereby declare the following to be a full, clear, and exact description of the invention, such as will enable others skilled in the art to which it appertains to make and use the same.

This invention relates to locking devices. It is primarily designed for locking the levers of various makes of automobiles, especially of the central control type, and I shall so illustrate and describe it, although it may manifestly be employed for locking levers for other purposes.

I am aware that there are locks for the transmission control levers of automobiles, but the importance of locking the brake control lever is not considered essential in conjunction therewith. At the outset, in order to fully understand the importance of my invention, I desire to emphasize this point. The brake lever may not be maintained locked in the downtown crowded fire districts, but oftentimes a machine is left standing unprotected for a long time in an out of the way position from the crowded streets. It may be a private driveway or even a shed, from whence it may be readily hauled away, though the transmission control lever is locked. Again it may be in the suburbs or on a steep hill, and in the latter case there are known instances, where the brake lever has been mischievously tampered with, being the later cause of a disastrous runaway. There are many other instances, such as picnic parties, leaving their machines standing unprotected against theft.

Therefore, the primary object of my invention is to provide a lock suitable for all conditions, whereby the levers may be locked independently of each other or conjointly, and by a simple unitary locking device.

Another object is to provide a lock, which is not only simple and durable in construction and use, but which is also comparatively inexpensive to manufacture, which is efficient in action, and a lock that can readily be attached to and operated with the usual makes of the present day car.

Another object of the invention is to provide a neat and compact device, of small dimensions, having a fixed member, the base of which may be disposed between the levers, when locked, and a hinged shackling member, adapted to be swung above said base when in operative position, and foldable behind said fixed member when not in use.

With these and other objects in view, the invention consists of the structural arrangement and combination of parts, as will be more fully described in the following specification and particularly pointed out in the appended claims.

It will be obvious that various minor arrangements might be made in actual manufacture, without departing from the spirit of the invention and without sacrificing any of the vital principles thereof, and while the invention is not limited, therefore, to the exact details as shown and described, still for the purpose of a full disclosure reference is had to the accompanying drawings illustrating practical embodiments of the same, in which drawings like characters designate the same parts in the several views, and in which—

Figure 3:
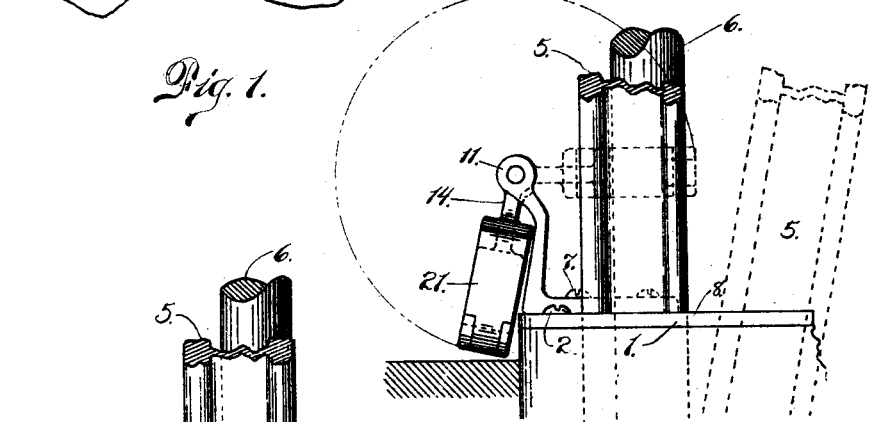
Figure 4:
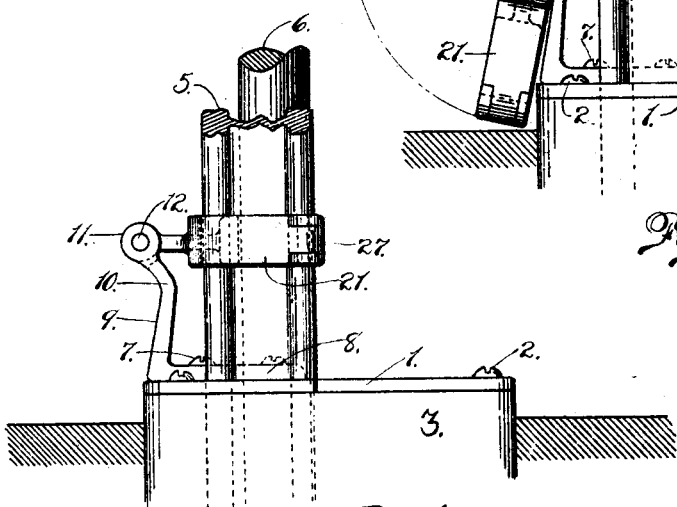

Figure 1, is a top plan view of my preferred form of locking device, secured to an automobile body, the brake and transmission control levers being shown in cross-section, in their locked positions, and the released positions of the locking arms being shown in dotted lines. Fig. 2, is a similar view of the locking device itself, the top plate of the housing being removed, and showing a lock incased therein. Fig. 3, is a view in side elevation, the shackle member being shown in full lines in its rearwardly folded position, and in dotted lines with relation to its locking position. Fig. 4, is a side elevation of the parts in their locked relation. Fig. 5, is a perspective view of a modified form, shown in its locking position. Fig. 6, is a fragmentary perspective view, the locking arm for the brake lever being released, and that for the transmission being in locking position, and Fig. 7, is a perspective view, showing the hinged member with both locking arms open, and being folded back out of the way into its position behind the base member.

Broadly speaking the invention consists of a base, a shackle member hinged thereto, having open faced slots or pockets, coöperating with hinged locking arms, the said arms being capable of being independently or conjointly locked to said shackle member by a single locking means such as a pin tumbler lock, as shown in the preferred form, or a padlock as shown in the modification, the whole comprising a neat, compact, unitary, foldable structure.

To describe my device in detail, and referring first particularly to Figs. 1 to 4, the numeral 1 designates a floor plate, suitably secured, as by bolts or screws 2, to a portion of the automobile base 3, or directly to the floor as desired, and this floor plate has an elongated opening or slot 4, corresponding with a similar slot in the floor of the car to permit of the oscillation of the brake control lever 5, a suitable aperture being also provided through the plate and the floor to allow the transmission control lever 6 to be maintained in operative relation with the transmission mechanism in the usual way, when it is not desired to lock the lever against movement, but of course the contour of this opening is dependent upon the type of car on which the invention is applied and whether the lever has a varying back and forth and sidewise oscillatory movement, as when a universal bearing is employed, or moves back and forth in the same plane, in which latter instance the nature of the opening would necessarily be an elongated slot. To the floor plate 1 is securely affixed my improved locking device in any suitable way, illustrated simply by the screws 7. This locking device includes primarily a fixed and a hinged or pivoted member. The fixed member consists of a base plate 8, secured to the floor plate, by the fastening means 7, and may be disposed directly between the aperture for the transmission lever and the rear end of the brake lever slot 4. Formed integrally with the base plate 8 is an upwardly disposed extension 9, which may have a rearwardly inclined portion 10 terminating in a bearing member coöperating with a bearing member of the hinged shackle, hereinafter referred to in detail. While these bearing members may be of any suitable character, in the drawings I have shown the upper end of the portion 10 as terminating in spaced ears 11 apertured to receive the pivot or hinge pin 12, on which the complementary sleeve 13 of the hinged member is rotatably mounted. From this bearing sleeve 13 extends a narrow neck or shank 14, which terminates in extended and widened front and side walls 15, having top and bottom plates 16, which may be secured by screws or rivets, indicated at 17, to the top and bottom edges of said walls, the whole forming an enlarged central casing or housing for the reception of a suitable lock 18, which in turn may be secured by screws or rivets 19 to the bottom plate of the casing. This is by way of illustration, although of course the casing could be made as an entirety with an open front, like the mortise of a door and the lock slipped into place. Also the lock itself forms no part of the present invention and may be of any suitable type, such as a chest lock, provided with a pair of laterally operating oppositely disposed twin bolts, and a pair of openings in its front wall, registering with similar openings 32 in the front wall of the casing, to receive a pair of locking eyes or apertured lugs, hereinafter referred to, and into which the pair of bolts may be shot for locking purposes. Formed integrally with the rear of the casing are a pair of oppositely disposed arms 20 and 21, which first extend laterally and thence forwardly to form with the side walls of the casing a pair of open-faced slots or pockets 22 and 23, of suitable contour, to receive the transmission and brake control levers, and the ends of these arms or extensions, which terminate substantially in line with the outer portion of the casing, are suitably formed to provide pivotal or hinged bearings 24 and 25, for a pair of swinging locking arms or bars 26 and 27 of sufficient length to extend to a position adjacent a lug 28, located on the front wall of the casing, although, as heretofore stated, the casing or housing may have an open front, in which instance, of course, the front wall thereof and the lug 28 would be omitted. Also, it is evident that the pin tumbler lock might have its twin bolts disposed outside of its lock casing proper, and in that case, the lock casing would not have to be apertured to receive the locking lugs, as specifically described in the foregoing, and I consider these modified arrangements as obvious equivalents. When the lug 28 is employed, however, it performs the function of preventing a chisel or the like being forced beneath the end of the locked arm, if the other arm is released, to prevent the locked arm from being pried open, and this is particularly true, where the top and bottom plates 16, of the housing, project forwardly beyond same, above and below the arms 26 and 27, which I contemplate having done in actual practice. The inner faces of the free ends of the locking bars 26 and 27 are provided with inwardly disposed locking lugs 29 and 30, shown in the drawings, as at 31, as being apertured to form locking eyes or staples, into which the bolts of the aforesaid lock are laterally shot, when the parts are disposed in locking relation, but it would manifestly be equivalent to provide the locking lugs with inturned projections, or hooked or notched ends, to engage the twin bolts, instead of having the locking lugs apertured.

In the modified form, shown in Figs. 5 to 10

7, the construction is substantially similar, but in some types of cars the levers are so close together that it may be difficult to provide a central support of a size to incase a substantial lock, so that I have devised a slightly different locking arrangement. In this construction, instead of making the central portion in the form of a casing, this central portion is in the nature of a flat continuation 33 of the shank 14, having enlarged front and side walls 34, corresponding to the dimensions of the extensions 20 and 21, which form a continuation thereof, and on the front wall of the central portion 33 is located a central staple 35. The locking arms 26 and 27 are also made a little longer so as to overlap and pass across the front of the central portion, and the arm 26 may be recessed, as at 36, so that the free end of the arm 27 may be neatly set therein when the levers are conjointly locked. The free ends of the locking arms are also provided with registering slots, instead of the locking lugs shown in Figs. 1 to 4, which slots encompass the staple 35, when a padlock may be applied and the locking made complete, either where only one arm is locked, as in Fig. 6, or both arms are conjointly locked, as in Fig. 5.

While I have shown and prefer the base 8 to extend forwardly, so that it may be disposed directly between the lever openings, which is a decided advantage, in so far that it makes the whole arrangement more compact, stronger, better braced and safer against dislodgment, still in some instances, where the levers are closely arranged, it may be desirable or necessary to reverse the arrangement, but this does not depart from the main spirit of the invention.

From the foregoing complete description and the drawings, the operation will be clear. It might be stated, however, that when the locking arms are in the position shown in dotted lines in Fig. 1, both levers are released and the locking device may be folded back to the position shown in full lines in Fig. 3, where it will be disposed out of the way. When it is desired to lock either one of the levers independently of the other, the shackle having been swung into operative position, the locking arm 26 or 27, according to which lever is to be locked, is snapped into locking engagement with its complementary bolt of the lock 18, across the open face of the pocket with the lever disposed therein; and if both are to be locked, both arms are similarly operated and locked, as shown in Figs. 1, 2 and 4.

The operation in the modified form is evident, and while the particular locking arrangement is slightly different, still one locking arm may be locked independently of or conjointly with the other, but in all cases only a single lock is employed.

Having thus described my invention, what I claim is:—

1. In lever locking devices, a support having a pair of open faced pockets, each adapted to receive a lever, pivoted arms on said support adapted to swing inwardly across the open faces of said pockets toward the central portion of said support, and coöperating means, including a single lock, for locking either of said arms in its closed position independently of the other, or conjointly as desired.

2. In lever locking devices, a support having lateral extensions shaped to form an open faced pocket on each side of said support, adapted to receive levers, a locking arm pivoted on each of said extensions to swing inwardly toward said support and close the open faces of said pockets, and coöperating means, including a single lock, for locking either of said arms to said support in its closed position independently of the other or conjointly as desired.

3. In lever locking devices, a base plate having a vertical extension, a shackle member pivoted to said extension and adapted to be swung forwardly, in a horizontal plane, in operative locking relation with said levers and foldable rearwardly behind said vertical extension, when not in use, said shackle member having a pair of forwardly open-faced pockets, each adapted to receive a lever, and means coöperating between said support and the open faces of said pockets to close either of the latter independently of the other or conjointly, as desired, and a lock for said closing means.

4. In lever locking devices, a base plate having a vertical extension at its rear portion, a shackle member pivoted to said extension and adapted to be swung forwardly in a horizontal position above said base plate in operative relation with the levers to be locked and foldable rearwardly behind said vertical extension, when not in use, said base plate being adapted to rest between said levers, in their locked positions, said shackle member having a pair of forwardly open faced pockets, each adapted to receive a lever, movable parts carried by said shackle and operating over the open faces of said pockets to close either of the latter independently of the other or conjointly, as desired, and locking means, including a single lock, for said movable parts.

5. In lever locking devices, a base plate adapted to be fixedly supported adjacent a pair of levers and having a vertical extension, a shackle member pivoted at its rear end to said extension, and adapted to be swung forwardly and rearwardly on both sides of said extension, said shackle member consisting of an enlarged central portion having lateral extensions shaped to form an open faced pocket on each side of said central portion, each adapted to receive a lever, an operating arm pivoted on each of said lateral extensions to swing inwardly toward said central portion and close the open face of its complementary pocket, and coöperating means, including a single lock, for locking either of said arms to said central support independently of the other, or conjointly as desired.

6. In lever locking devices, a shackle member, adapted to be suitably supported adjacent a pair of levers to be locked independently or conjointly, comprising an enlarged central portion, an open faced pocket formed on each side of said central portion, pivoted locking arms mounted to swing toward said central portion and close said open faced pockets, a double bolt lock carried by said central portion, and locking lugs carried by said locking arms at their free ends, and adapted to engage their complementary bolt of said lock in locking relation.

7. In lever locking devices, a base plate having a vertical extension, a shackle member pivoted to said extension and adapted to be swung forwardly and rearwardly of said extension, said shackle member comprising an enlarged central portion having lateral extensions shaped to form an open faced pocket on each side of said central portion, each adapted to receive a lever, a locking arm pivoted on each of said lateral extensions so as to swing inwardly toward said central portion and close the open face of its complementary pocket, a double bolt lock carried by said central portion, and locking lugs carried by the free ends of said locking arms, and adapted to independently or conjointly engage said lock in locking relation.

8. In lever locking devices, a shackle member, adapted to be suitably supported adjacent a pair of levers to be locked independently or conjointly, comprising a central housing, an open faced pocket formed on each side of said housing, pivoted locking arms mounted to swing inwardly toward the front of said housing and close the open faces of their complementary pockets, a lock, having oppositely disposed twin locking bolts, incased in said housing, and locking lugs on the free ends of said arms and adapted to engage, in locking relation, their complementary bolt of said lock.

9. In lever locking devices, a shackle member, adapted to be suitably supported adjacent a pair of levers to be locked independently or conjointly, comprising a central housing, an open faced pocket formed on each side of said housing, pivoted locking arms mounted to swing inwardly into engagement with the front wall of said housing and close the open faces of their complementary pockets, a lock, having oppositely disposed twin locking bolts, incased in said housing, a pair of apertures being formed in the front wall of said housing, locking lugs on the free ends of said arms, and adapted to engage their complementary bolt of said lock through said apertures, and a forwardly projecting lug on the front wall of said housing, located between said apertures and between the free ends of said arms when in their locked positions, to prevent a locked arm from being pried open at the end when the other arm is unlocked.

10. In lever locking devices, a base plate having a vertical extension, a shackle member pivoted to said extension and adapted to be swung forwardly and rearwardly thereof, said shackle member comprising a central housing having lateral extensions shaped to form an open faced pocket on each side of said central portion, each adapted to receive a lever, a locking arm pivoted on each lateral extension so as to swing inwardly toward said casing or housing and close the open face of its complementary pocket, a lock, having oppositely disposed twin locking bolts, incased in said housing, and locking lugs on the free ends of said arms and adapted to engage, in locking relation, their complementary bolt of said lock.

In testimony whereof, I affix my signature.

JOHN BRUEHNE.